Figure 11:
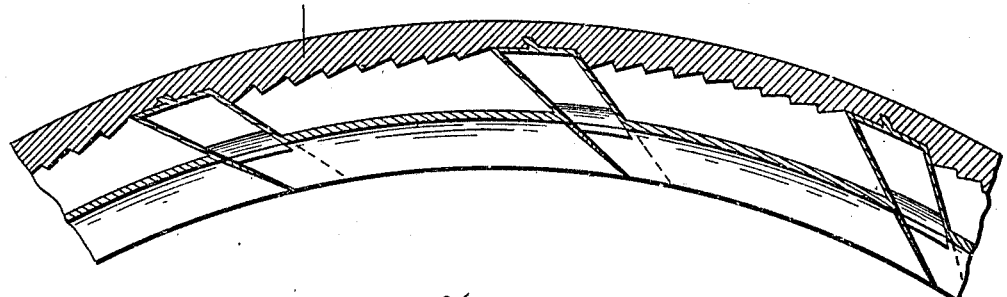

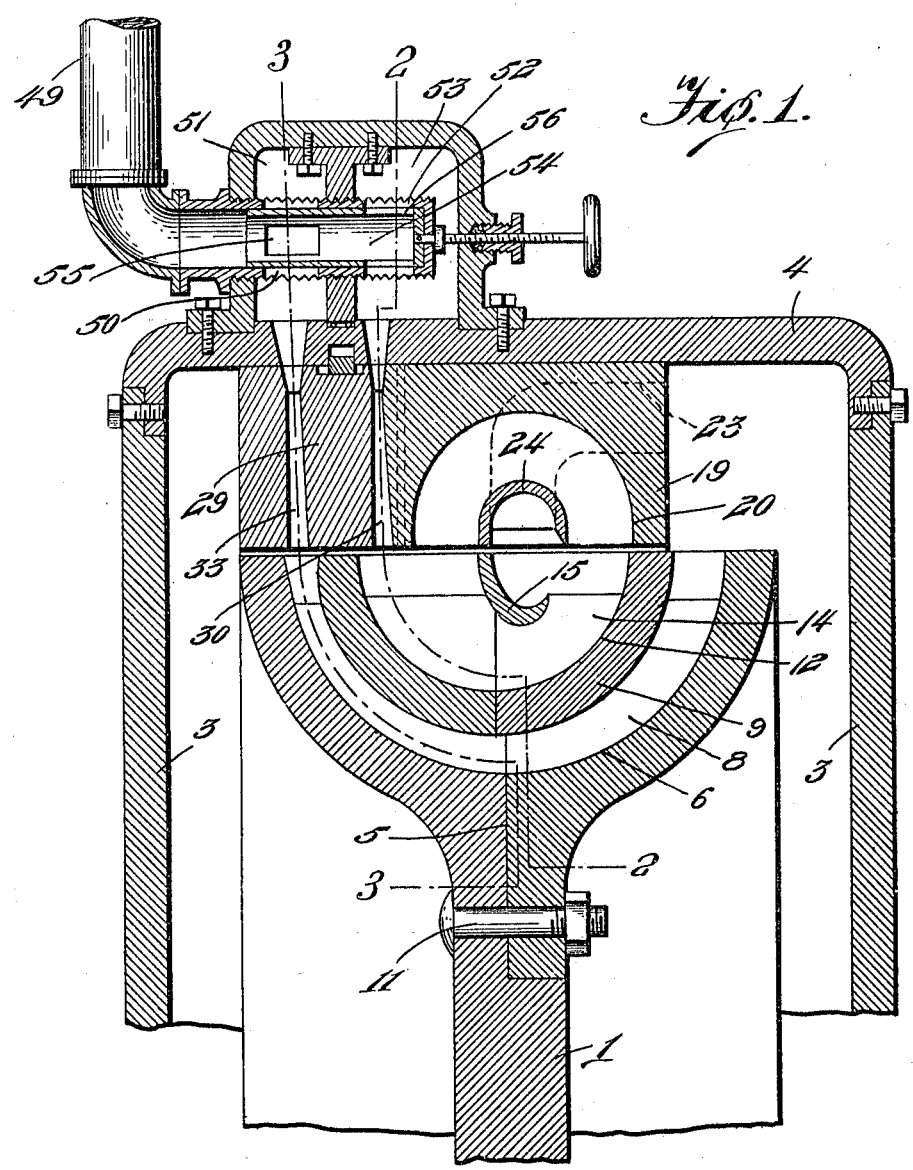

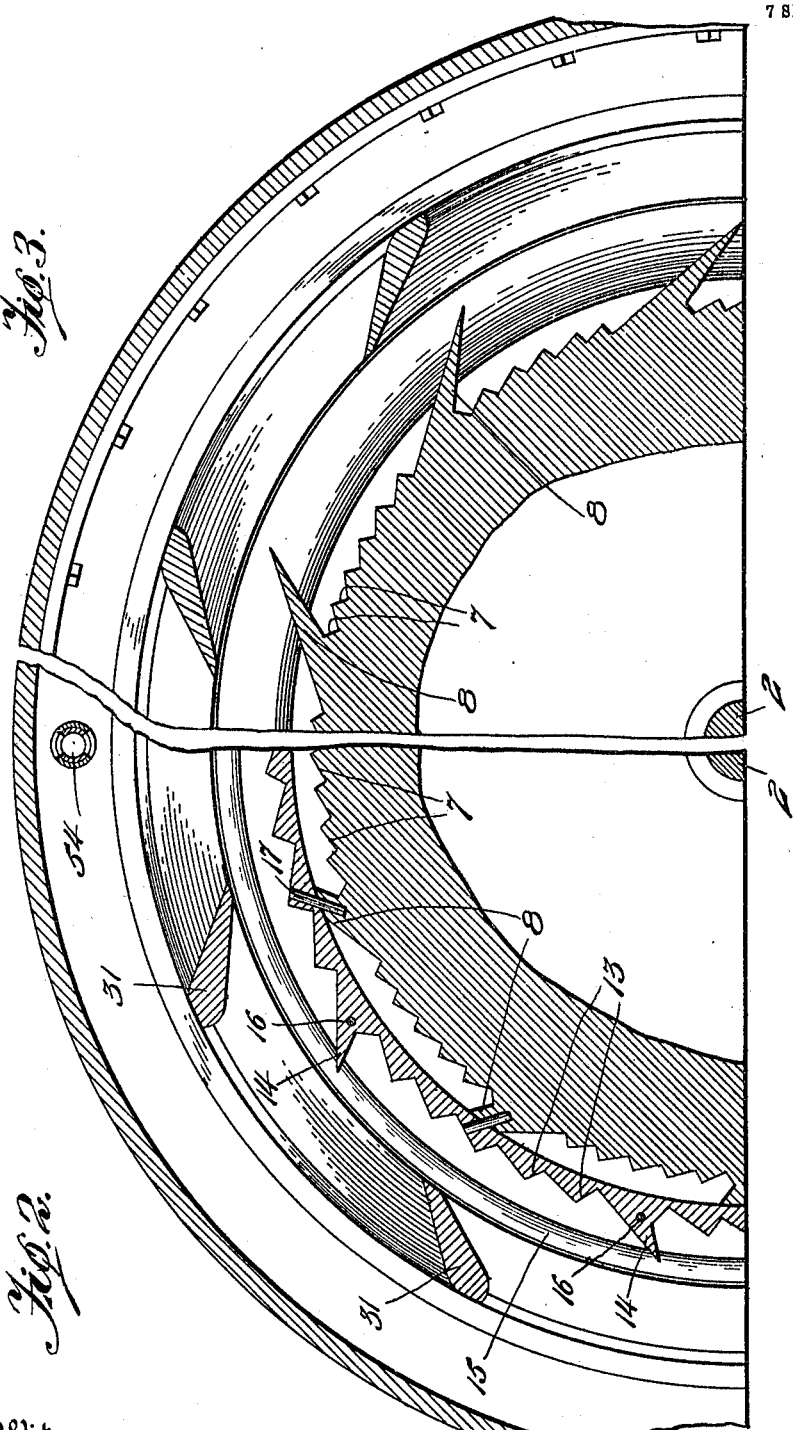

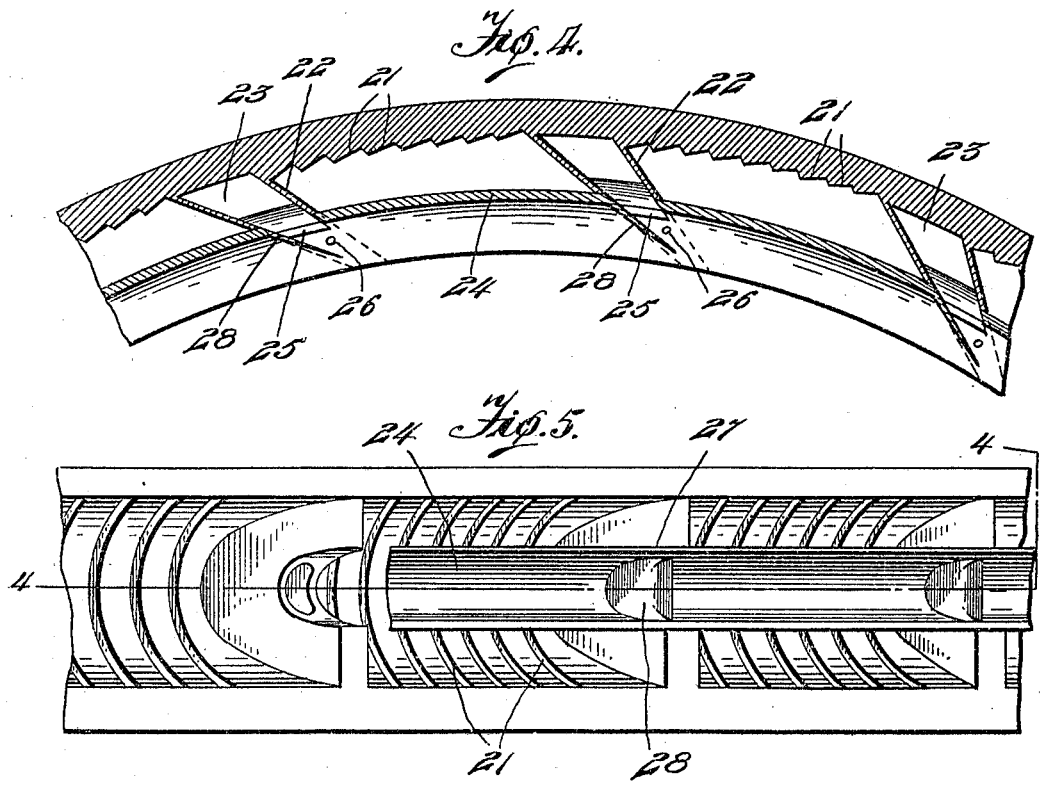
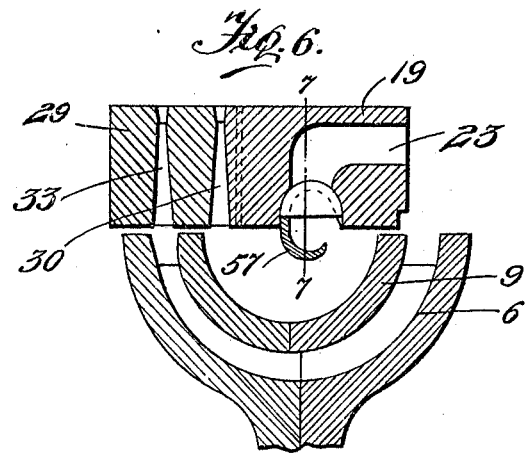

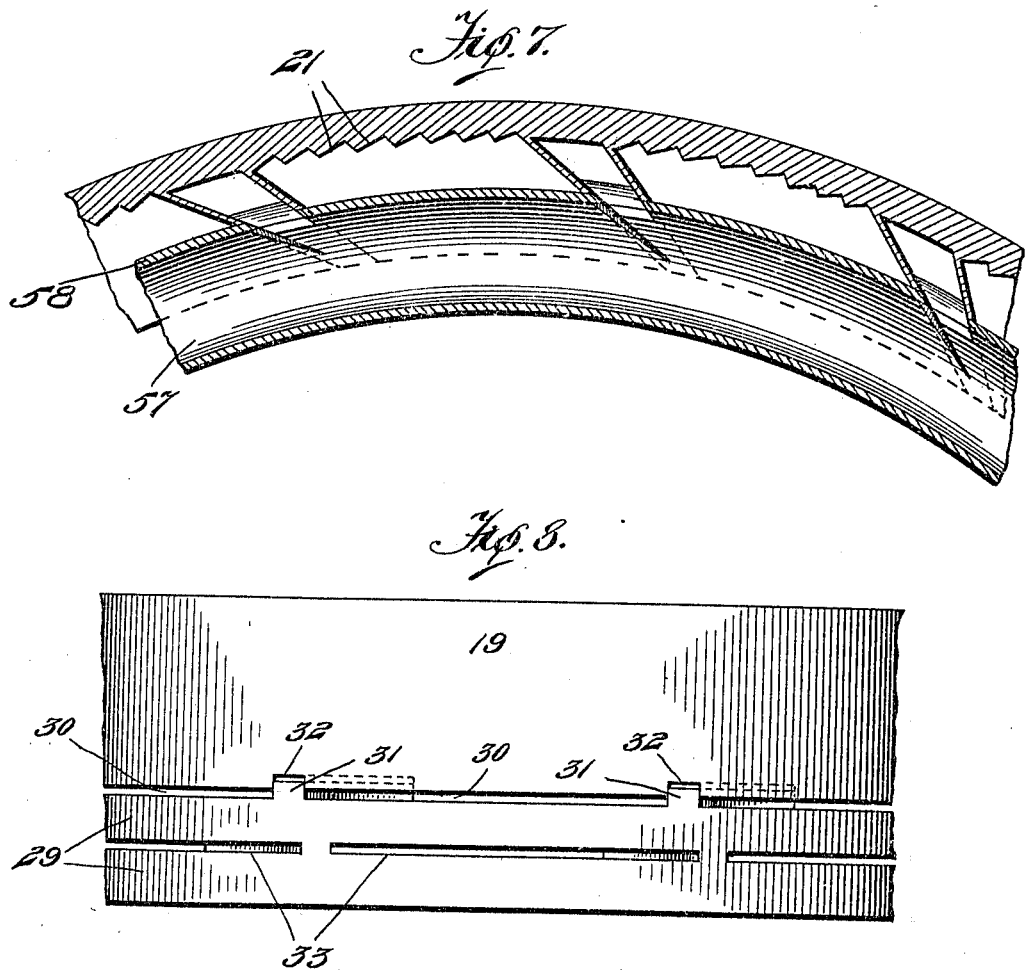

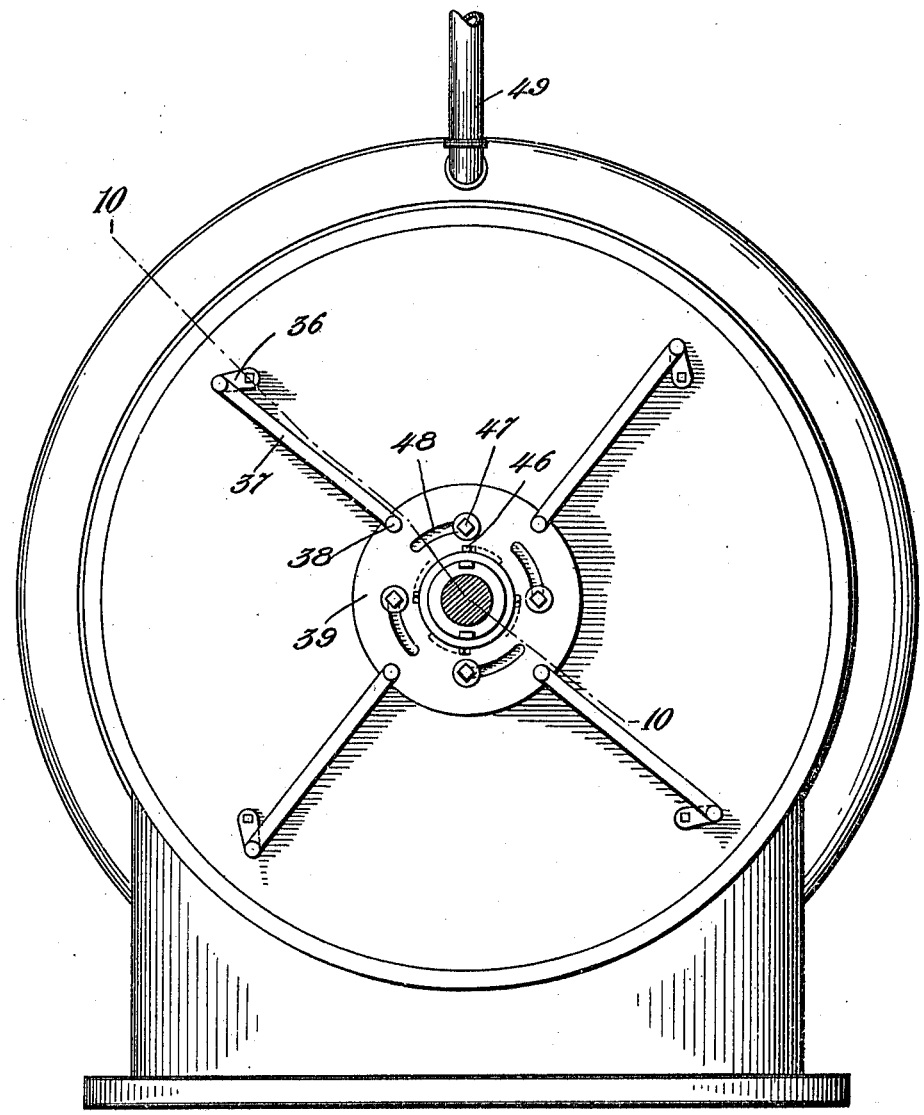

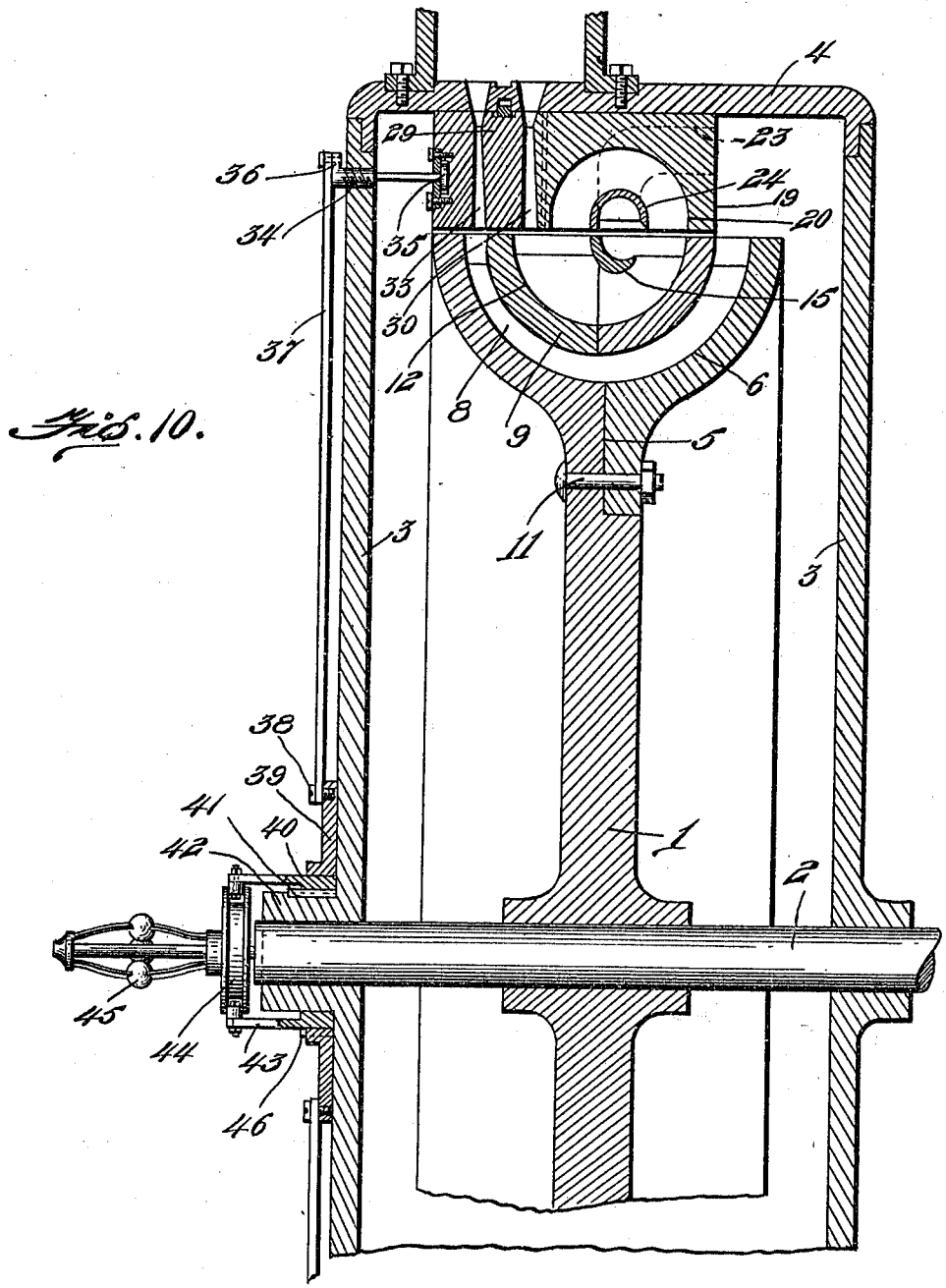

R. H. GOLDSBOROUGH.
TURBINE.
APPLICATION FILED FEB. 4, 1910.

953,013.

Patented Mar. 22, 1910.
7 SHEETS—SHEET 7.

Witnesses

Inventor
Richard H. Goldsborough.
by
Attorney

UNITED STATES PATENT OFFICE.

RICHARD H. GOLDSBOROUGH, OF WASHINGTON, DISTRICT OF COLUMBIA.

TURBINE.

953,013.  Specification of Letters Patent. Patented Mar. 22, 1910.

Application filed February 4, 1910. Serial No. 542,087.

*To all whom it may concern:*

Be it known that I, RICHARD H. GOLDSBOROUGH, a citizen of the United States, residing at Washington, in the District of Columbia, have invented certain new and useful Improvements in Turbines, of which the following is a specification.

My invention relates to improvements in turbines, and it consists in the constructions, combinations and arrangements herein described and claimed.

An object of my invention is to provide an improved turbine in which the actuating steam is directed to the several deflecting surfaces of the rotor in a concentric series of consolidated steam layers, the several steam layers of such concentric series constituting fluid guides for deflecting the inner layers thereof; thereby minimizing the chief thermodynamic loss occurring in existing turbine constructions through friction of the rapidly-flowing steam.

A further object of my invention is to provide an improved turbine provided with adjustable ports, or passages, for initially directing layers of actuating steam to the deflecting surfaces of the rotor and constructed to direct such steam successively to said several deflecting surfaces in concentric series of layers; said adjustable ports, or passages, enabling the degree of expansion employed and the thickness of such steam layers to be varied for accommodating the turbine to variations of load, and to adapt it for efficient operation either condensing or non-condensing.

A further object of my invention is to provide an improved turbine provided with an annular series of admission passages for directing the actuating steam in a consolidated annular sheet, or layer, throughout full peripheral admission to the rotor; thereby eliminating the material losses due to surface friction in the existing types of steam nozzles.

A further object of my invention is to provide an improved turbine which will operate with a minimum of surface and fluid friction, and permit the employment of maximum clearances with minimum leakage losses.

A further object of my invention is to provide a compact and powerful reversing turbine capable of being quickly reversed when running at speed, and in which the actuating steam will act as an elastic brake for bringing the rotor to rest preliminary to reversing its rotation.

A further object of my invention is to provide a multi-stage turbine, in which the actuating steam can be efficiently directed through the admission passages and rotor reversing chamber in a consolidated mass of large cross-section for eliminating all wasteful friction and clearance losses.

Figure 12:
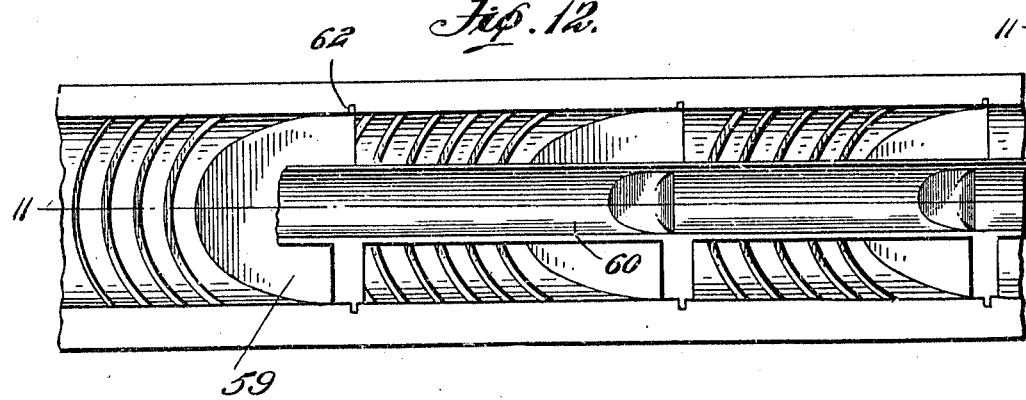
Figure 13:
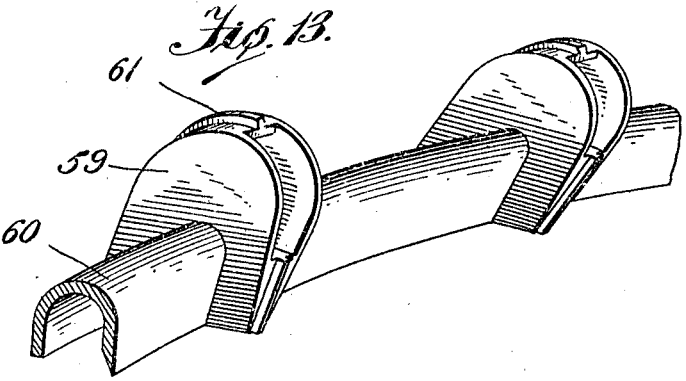

In the accompanying drawings, forming a part of this application and in which similar reference symbols indicate corresponding parts on the several views; Figure 1 is a detail axial section, illustrating one embodiment of my invention; Fig. 2 is a section on the line 2—2 of Fig. 1; Fig. 3 is a section on the line 3—3 of Fig. 1; Fig. 4 is a section on the line 4—4 of Fig. 5; Fig. 5 is an inner view of the stator deflecting member shown in Fig. 1; Fig. 6 is a detail section, illustrating a modification in which the partitions are omitted from the annular series of forward-drive rotor vanes; Fig. 7 is an enlarged section on the line 7—7 of Fig. 6; Fig. 8 is a detail outer view of the stator members surrounding the rotor; Fig. 9 is a head elevation of the turbine illustrated in the preceding figures; Fig. 10 is an enlarged section on the line 10—10 of Fig. 9; Fig. 11 is a section on the line 11—11 of Fig. 12; Fig. 12 is an inner view of a modified form of stator deflecting member, in which the saddles constituting the exhaust conduits are formed integral with the inner annular core, and Fig. 13 is a perspective view of the core and integral exhaust conduits shown in Figs. 11 and 12.

Referring to the drawings, 1 indicates a rotor secured on a shaft 2 which extends through the heads 3 of a turbine casing 4. The outer portion of the rotor is split at 5 and provided with a peripheral recess 6 formed with an annular series of stepped deflecting surfaces being divided into sets by partitions 8 preferably formed integral with the rotor. An annular member 9 of substantially U-shaped cross-section is closely seated on the several partitions 8 with its convex wall coöperating with the deflecting surfaces 7 to constitute a confining and guiding core for the steam directed to said surfaces. The annular member 9 is preferably split longitudinally and is firmly held in position by bolts 11 clamping together the split portion of the rotor.

The concave outer periphery of the annular member 9 provides a recess 12 which is formed with a stepped annular series of deflecting surfaces 13 for forward drive of the rotor; said annular series of forward deflecting surfaces being divided into sets by partitions 14 preferably formed integral with the two halves of the split member 9. An annular core 15 is tightly seated on the partitions 14 and firmly clamped in position by bolts 16 extending through the annular member 9 and its integral partitions 14. The annular member 9 is rigidly secured in position by bolts, or pins, 17 extending into the partitions 8 integral with the rotor, and the annular core 15 can be similarly secured to its supporting partitions 14.

An annular stator member 19 is secured within the casing 4 and provided with a chamber 20 having a stepped annular series of deflecting surfaces 21, which latter coöperate with the similar series of forward-drive deflecting surfaces 13 on the rotor to constitute a continuous steam passage for directing the actuating steam along paths of uniform length successively to the rotor. The series of deflecting surfaces 13 and 21 are formed substantially perpendicular to the path of the actuating steam, thereby providing a very advantageous construction for insuring an efficient deflection of the steam along paths of uniform length.

Hollow saddles 22 extend from the annular series of stator deflecting surfaces 21 to provide exhaust conduits for discharging the steam laterally through openings 23 in the stator member 19 to the interior of the turbine casing, or other suitable exhaust chamber; said saddles being shown suitably inclined for directing the steam at an efficient angle to the rotor. An annular hollow core 24 is closely seated in the several saddles 22 with its interior in communication therewith through apertures 25; said core being shown rigidly secured to said saddles by pins 26.

One leg of the U-shaped core 24 is formed with a knife edge 27, which is positioned to overlap the discharge side of the rotor core 15; thereby extending into the path of the steam finally discharged from the rotor directly adjacent to said core 15, for directing such discharge to the interior of the hollow core 24. A series of deflecting blades 28 are secured within the hollow core 24 for deflecting the steam therefrom to the several exhaust conduits 22; if desired, said deflecting blades may extend across the entire interior of the hollow core 24.

An annular member 29 is adjustably mounted in the casing 4 adjacent to the stator member 19, with the contiguous faces of said two members shaped to form an annular admission passage, or port, 30 for full peripheral initial admission to the forward-drive deflecting surfaces of the rotor. A plurality of partitions 31 are carried by the adjustable member 29 for slidably entering recesses 32 in the stator member 19; said partitions acting to divide the annular passage 30 into a continuous series of admission passages, or ports. The adjustable member 29 is provided with a continuous annular series of ports, or passages, 33 for directing steam to the reverse-drive deflecting surfaces 7 of the rotor.

Any suitably manually-operated or automatic means may be employed for adjusting the annular member 29. I have shown an adjusting means comprising screws 34 threaded in the rotor casing and swiveled at 35 in the member 29. The outer ends of the screws 34 are provided with cranks 36 on a wrist plate 39, which latter is rotatably mounted on a sleeve 40 slidably secured by a spline 41 on the hub 42 of the casing head 3. The sleeve 40 is provided with arms 43 engaging an annular slot in the movable collar 44 of a governor 45, whereby the sleeve will be shifted axially by the action of said governor. Inclined splines 46 on the sleeve 40 engage the wrist plate 39 for rotating the latter upon axial shifting of said sleeve; headed bolts 47 engaging arc shape slots in the wrist plate for confining the latter against all axial movements. A main steam pipe 49 communicates through openings 50 with an annular supply chamber 51 for the reverse-drive nozzles 33, and through openings 52 with an annular supply chamber 53 for the forward-drive nozzles 30. A cylindrical valve 54 is rotatably mounted in the pipe 49 and provided with angularly positioned openings 55 and 56 for placing the main steam pipe 49 in communication with either the reverse-drive chamber 51 or the forward-drive chamber 53.

In the operation of my invention for forward drive of the rotor, steam is admitted to the supply chamber 53, from which it is directed by the annular series of initial passages 30 in a thin sheet, or layer, to the annular series of the rotor deflecting surfaces. This initial layer of steam is reversed by said series of deflecting surfaces, and discharged therefrom at reduced velocity to the circumscribing series of stator deflecting surfaces 21. The steam thus discharged at reduced velocity from the rotor is directed by the stator surfaces 21 as a secondary layer to the rotor, where it consolidates with, and is deflected by, the initial steam layer simultaneously directed to the rotor deflecting surfaces 13; the more rapidly flowing initial layer constituting a fluid guide for efficiently deflecting such secondary steam layer. The initial and secondary steam layers are discharged from the rotor to the circumscribing series of stator deflecting surfaces 21, by which they are redirected as consolidated secondary and tertiary layers to the rotor; the initial steam layer simultaneously directed to the rotor deflecting surfaces 13 constituting a fluid guide for efficiently deflecting such secondary layer, which latter acts in turn as a fluid guide for the tertiary layer. The initial, secondary, and tertiary steam layers are discharged from the rotor to the circumscribing series of stator deflecting surfaces 21, by which they are redirected as consolidated secondary, tertiary, and quaternary layers to the rotor, where they consolidate with the initial steam layer simultaneously directed thereto; the several concentric layers constituting the more slowly moving succeeding layers. After the four concentric layers have been thus deflected as a consolidating body in the rotor, the quaternary layer is sheared off by the knife edge 27 of the hollow annular core 24 and directed rearwardly into the interior of said core, where it is deflected by the blades 28 through the exhaust conduits 22 and laterally openings 23 to any suitable exhaust. The remaining three steam layers, from which the quaternary layer has been sheared, are discharged from the rotor to the circumscribing series of stator deflecting surfaces 21, by which they are directed as consolidated secondary, tertiary, and quaternary layers to the rotor, where they consolidate with the initial steam layer simultaneously directed thereto.

The above described steps are repeated during the continuous operation of my invention until all the actuating steam has been directed to four successive impacts on the rotor deflecting surfaces 13 and finally exhausted as a quaternary layer into the hollow core 24.

While I have described the steam as employed in only four impacts, it will be obvious that any desired number of impacts could be employed.

In the above described operation, the actuating steam is directed to the several rotor deflecting surfaces 13 in a plurality of overlapping spinal steam currents of progressively decreasing coil radii, whereby a concentric series of independent steam coils, or layers, is directed to said deflecting surfaces in a consolidated mass, in which the several coils have velocities proportionate to the lengths of their paths and constitute fluid guides for deflecting the more slowly flowing inner layers of the concentric series; thereby minimizing surface and fluid friction and eliminating the loss due to wasteful dispersion and eddy currents. In this operation, the initial steam layer flowing at high velocity constitutes an envelop for guiding and completely inclosing the more slowly flowing inner steam layers whose velocity has been degraded by impact with the rotor; thereby permitting the employment of maximum clearances with minimum leakage losses.

During the above-described forward drive of the rotor, the annular member 29 will be shifted by the governor 45 to automatically adjust the initial ports, or passages, 30 for maintaining a constant rotative speed of the turbine under all variations of load. The adjustable initial passages 30 also provide means for regulating the thickness of the initial steam layer, with a resulting corresponding decrease in the thicknesses of all of the succeeding steam layers comprising the concentric series directed in a consolidated body to the rotor; thereby enabling both the rate and total range of expansion of said steam layers to be varied, to adapt the turbine for efficient operation either condensing or non-condensing.

Figs. 6 and 7 illustrate a modification in which the partitions 14 are omitted from the stepped annular series of forward-drive rotor deflecting surfaces, and a central confining core 57 for said surfaces is supported by an annular core 58 of the stator deflecting surfaces 21; a preferable construction is to form said rotor and stator cores integral, as shown in the drawings.

Figs. 11–13 illustrate an improved construction, in which the saddles 59 are formed integral with the annular stator core 60, and provided with peripheral flanges 61 for entering slots 62 in the stator member 63; the assembled parts being secured together in any well known manner.

I have illustrated and described preferred and satisfactory constructions, but changes could be made within the spirit and scope of my invention.

Having thus described my invention, what I claim as new and desire to secure by Letters Patent is:

1. In a turbine, the combination of a rotor provided with a deflecting chamber, and means for simultaneously directing a concentric series of independent steam layers to said chamber.

2. In a turbine, the combination of a rotor provided with a deflecting chamber, and means for directing a concentric series of independent steam layers in a consolidated mass to said chamber.

3. In a turbine, the combination of a rotor provided with a series of deflecting surfaces, and means for directing a concentric series of steam layers in a consolidated mass to the several deflecting surfaces of said series.

4. In a turbine, the combination of a rotor provided with a series of deflecting surfaces, and means for simultaneously directing a concentric series of independent steam layers to the several deflecting surfaces of said series.

5. In a turbine, the combination of a rotor provided with deflecting surfaces, means for directing a concentric series of steam layers to said deflecting surfaces, and means for deflecting the inner layer of such concentric series to an exhaust.

6. In a turbine, the combination of a rotor provided with deflecting surfaces, means for directing a concentric series of steam layers in a consolidated body to said deflecting surfaces, and means extending in the path of such consolidated body for separating the inner portion therefrom.

7. In a turbine, the combination of a rotor provided with deflecting surfaces, means for directing a concentric series of steam layers to said deflecting surfaces, and a hollow core within such concentric series of steam layers provided with a lip extending in the path of the inner layer of said series.

8. In a turbine, the combination of a rotor provided with deflecting surfaces, means for directing a concentric series of steam layers to said deflecting surfaces, a hollow core within such concentric series of steam layers in communication with a suitable exhaust, and means for deflecting the inner portion of such steam layers into the hollow core.

9. In a turbine, the combination of a rotor provided with deflecting surfaces, means for directing a concentric series of steam layers in a consolidated body to said deflecting surfaces, a hollow core provided with an opening extending across the path of the inner portion of such consolidated steam body, and means within said core for deflecting the steam therefrom to a suitable exhaust.

10. In a turbine, the combination of a rotor provided with a series of deflecting surfaces, means for directing initial steam currents to said surfaces, and means for conducting such initial currents along overlapping spiral paths and directing the overlapping coils of such several steam spirals in similar consolidated masses to said several deflecting surfaces.

11. In a turbine, the combination of a rotor provided with a series of deflecting surfaces, means for directing initial steam currents in a consolidated layer, or sheet, to the several deflecting surfaces of said series, and means for conducting such consolidated steam layer successively to said deflecting surfaces in a spiral steam current having overlapping concentric coils.

12. In a turbine, the combination of a rotor provided with deflecting surfaces, means for successively directing to said deflecting surfaces a plurality of overlapping spiral steam currents of progressively decreasing coil radii, and means for deflecting the final coils of such several overlapping spirals to an exhaust.

13. In a turbine, the combination of a rotor provided with deflecting surfaces, means for successively directing to said deflecting surfaces a plurality of overlapping spiral steam currents of progressively decreasing coil radii, a hollow core within such overlapping spiral steam currents, and means for deflecting the final coils of such steam spirals into said core.

14. In a turbine, the combination of a rotor and a stator provided with coöperating deflecting surfaces to constitute a continuous steam passage, and a hollow core positioned within such passage with its interior in communication therewith.

15. In a turbine, the combination of a rotor and a stator provided with coöperating deflecting surfaces to constitute a continuous steam passage, exhaust conduits extending within such passage, and a hollow confining core supported by said conduits with its interior in communication with said conduits and steam passage.

16. In a turbine, the combination of a rotor and a stator provided with coöperating deflecting surfaces to constitute a continuous steam passage, exhaust conduits extending within such passage and constructed to provide directing surfaces, a hollow core communicating with said exhaust conduits, and means for deflecting steam from such continuous passage to the interior of said hollow core.

17. In a turbine, the combination of a rotor and a stator provided with annular series of coöperating deflecting surfaces to constitute a continuous steam passage, and a hollow annular core positioned within such passage with its interior in communication therewith.

18. In a turbine, the combination of a rotor and a stator provided with annular series of coöperating deflecting surfaces to constitute a continuous steam passage, a series of exhaust conduits extending within such passage, and a common hollow core with its interior in communication with said conduits and steam passage.

19. In a turbine, the combination of a rotor provided with deflecting surfaces, means for directing a concentric series of independent steam layers to said deflecting surfaces, and means for varying the thickness of such several steam layers.

20. In a turbine, the combination of a rotor provided with deflecting surfaces, means for directing a concentric series of steam layers to said deflecting surfaces, means for varying the thickness of such several steam layers, and means for directing the inner steam layer of such concentric series to an exhaust.

21. In a turbine, the combination of a rotor provided with deflecting surfaces, means for directing a concentric series of steam layers in a consolidated mass to said deflecting surfaces, and means for varying the number of steam layers in such consolidated mass.

22. In a turbine, the combination of a rotor provided with deflecting surfaces, means for directing steam successively to said deflecting surfaces in a plurality of overlapping spiral steam currents, whereby a concentric series of steam coils, or layers, is directed in a consolidated mass to said several deflecting surfaces, and means for varying the number of coils in such several steam spirals.

23. In a rotor, the combination of a rotor provided with deflecting surfaces, adjustable ports, or passages, for initially directing steam layers to said deflecting surfaces, means for directing such steam successively to said surfaces in concentric series of layers, and means for adjusting said ports to vary the size and degree of expansion of such steam layers.

24. In a turbine, the combination of a rotor having a peripheral recess provided with deflecting surfaces for reverse-drive of the rotor, and an annular core secured within such recess and provided with deflecting surfaces for forward-drive of the rotor.

25. In a turbine, the combination of a rotor having a peripheral recess provided with deflecting surfaces for reverse-drive of the rotor, an annular core of substantially U-shaped cross-section secured within such recess with its convex wall coöperating with said deflecting surfaces to constitute a confining guide, and deflecting surfaces for forward-drive of the rotor carried by the concave wall of said U-shaped core.

In testimony whereof I affix my signature in presence of two witnesses.

RICHARD H. GOLDSBOROUGH.

Witnesses:
  G. AYRES,
  B. M. OFFUTT.